Sept. 1, 1942.    S. KARAS    2,294,668
FOUNTAIN GLASS WASHER
Filed July 14, 1941
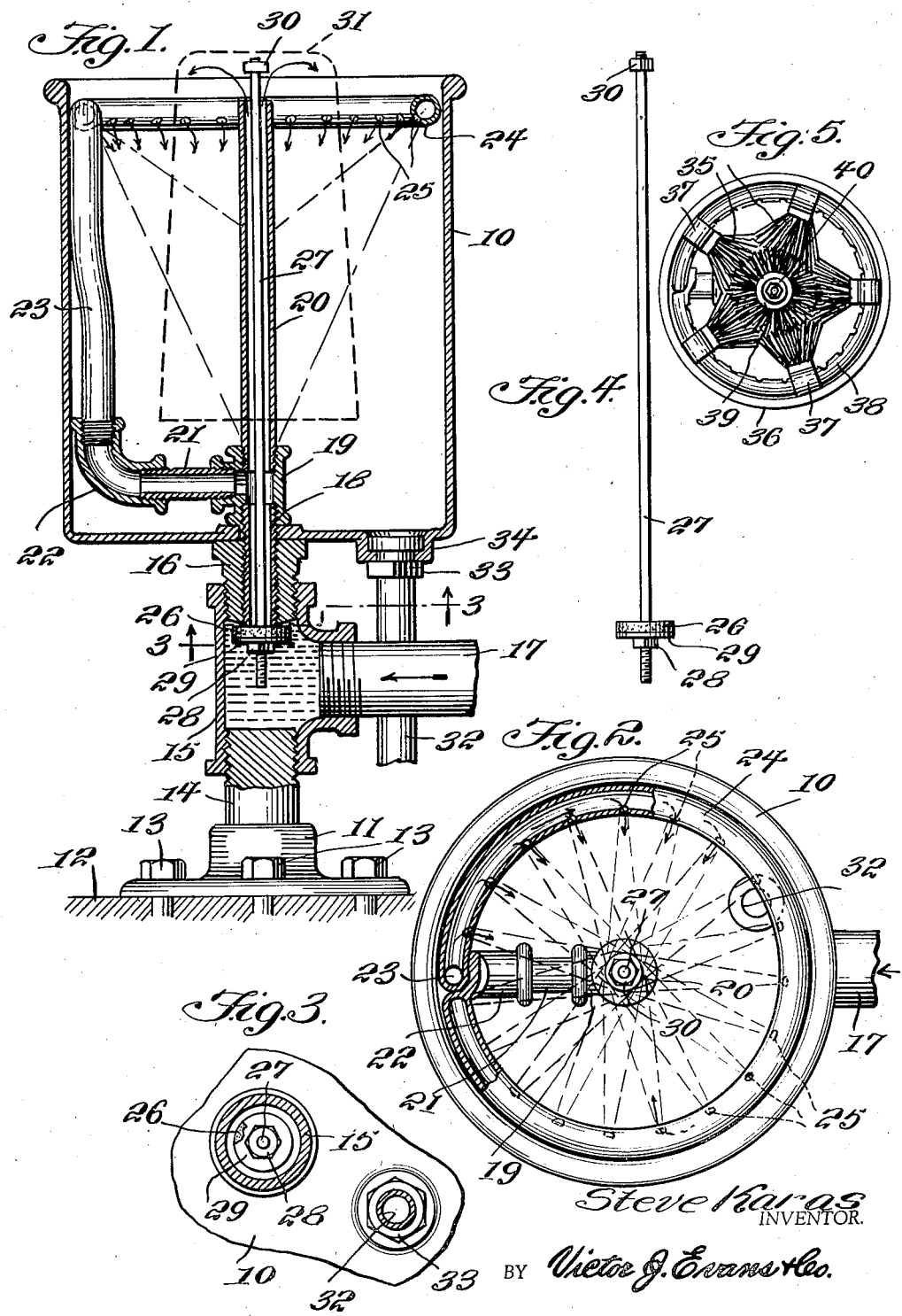

Patented Sept. 1, 1942

2,294,668

UNITED STATES PATENT OFFICE 2,294,668

FOUNTAIN GLASS WASHER

Steve Karas, Gary, Ind.

Application July 14, 1941, Serial No. 402,402

1 Claim. (Cl. 141—3)

This invention relates to a fountain glass washer and has for an object to provide a simplified device of this character in which the drinking glass is inverted upon a valve stem in a container to open the valve and permit jets of water being directed through suitable pipes throughout the entire exterior and interior of the glass for thoroughly cleansing the same in minimum time and without manual effort.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a longitudinal sectional view of a fountain glass washer constructed in accordance with the invention.

Figure 2 is a top plan view of the glass washer with portions broken away.

Figure 3 is a detail cross sectional view taken on the line 3—3 of Figure 1.

Figure 4 is a side elevation of the valve and valve stem.

Figure 5 is a top plan view of a modified form of glass washer showing the same equipped with brushes.

Referring now to the drawing in which like characters of reference designate similar parts in the various views, 10 designates a container which may be cylindrical in contour as shown, or other shape. The container is supported upon a flanged base 11 which may be secured to a support 12 by bolts 13 or other connections. The base is provided with an exteriorly threaded rod 14 which is engaged in one of the aligned branches of a T-coupling 15. A tubular nut 16 is engaged in the other aligned branch and is secured to the center of the bottom of the container. A water supply pipe 17 enters the lateral branch of the T-coupling.

An exteriorly threaded pipe 18 is engaged in the bore of the nut 16 and the bottom of the pipe forms a valve seat. The upper end of the pipe projects above the bottom of the container 10 and is received in one of the aligned branches of a T-coupling 19. A pipe 20 is received at the bottom in the other aligned branch and extends axially in the container to nearly the top of the container.

A pipe 21 is threadedly engaged in the lateral branch of the T-coupling 19 and is equipped at the outer end with an elbow 22 to which a pipe 23 is secured and extends to nearly the top of the container 10 at the inner surface of the container. An annular spray pipe 24 is secured to the upper end of the pipe 23 and is provided on the inner periphery with perforations 25.

A disk valve 26 is provided with a stem 27 which extends axially in the pipe 20 and projects above the pipe. The valve is secured to the stem by a nut 28 and a washer 29. The valve may be formed of any suitable material and is held in upwardly seated position on the lower end of the pipe 18 by water pressure through the water supply pipe 17. The upper end of the valve stem is equipped with a nut 30 or other suitable head adapted to support a drinking glass 31 in inverted position on the valve stem.

A drain pipe 32 enters the bottom of the container 10 and is secured in position by a nut 33 engaged against a hollow boss 34 through which the drain pipe enters the bottom of the container.

In operation the drinking glass 31 is inverted upon the valve stem 27 and thereupon the operator presses the glass downward to move the valve stem downward and open the valve 26 against water pressure in the T-coupling. Thereupon water under pressure flows upwardly through the pipe 18 into the T-coupling 19 and there the stream is divided, part passing upwardly through the axial pipe 20 and part passing upwardly through the pipe 23 to the spray pipe 24. The water is jetted or sprayed from the spray pipe 24 through the openings 25 against the entire exterior of the drinking glass, see Figure 2. Water is also directed upwardly from the upper end of the axial pipe 20 against the bottom of the drinking glass and diverted thereby throughout the entire inner surface of the glass. The glass may be held by the operator for only a very short period of time during which both the exterior and the interior of the glass is thoroughly cleansed. When the operator removes the glass, water pressure in the pipe 17 immediately closes the valve 26.

A modified form of the device is shown by Figure 5 in which a plurality of brushes 35 are mounted in the container 36. The brushes may be provided with tubular securing eyes 37 which may be attached to the spray pipe 38 in any preferred manner. A cylindrical brush 39 may be engaged on the central pipe 40. The bristles of both sets of brushes meet at a point between the central pipe and the wall of the container so that when the drinking glass is inverted upon the central pipe the outside surface of the glass will be in contact with the brushes 35 and the inside surface of the glass will be in contact with the brushes 39. Consequently when the water is let into the container through the central pipe and through the spray pipe to wash the glass the brushes will scour both the inside and the outside surfaces of the glass.

From the above description it is thought that the construction and operation of the invention will be fully understood without further explanation.

What is claimed is:

A fountain glass washer comprising, a container adapted to receive an inverted drinking glass, a water supply pipe entering the bottom of the container and extending axially in the container, a T-shaped coupling on the pipe engaging the top face of the bottom of the container, a branch pipe extending upwardly from the coupling along the inner surface of the container, an annular spray pipe concentric with the axis of the container secured to the branch pipe, a nut threaded on the water supply pipe engaging the bottom face of the bottom of the container, the pipe extending below the nut and being formed with a valve seat, an upwardly closing valve on the seat, a stem for the valve extending upwardly and terminating above the annular spray pipe and adapted to be depressed by an inverted drinking glass to open the valve, a T-shaped coupling having its lateral branch connected to a source of water supply and having its upper branch screw threaded on said nut, said valve being housed in said coupling, a threaded rod engaged in the lower branch of the coupling, and a base connected to the rod for securing the glass washer to a support.

STEVE KARAS.